Nov. 17, 1959  R. A. DIBLEY ET AL  2,913,293
FLUID SEALING DEVICE
Filed Jan. 4, 1957
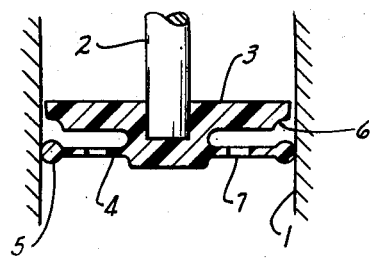
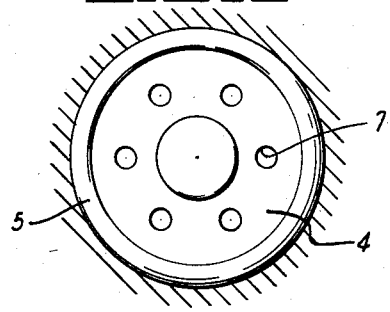
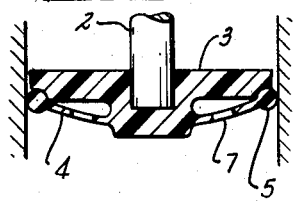
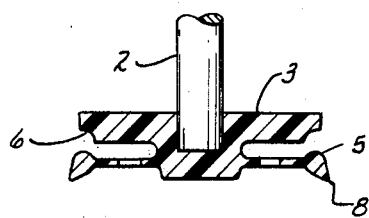
INVENTORS
RAYMOND A. DIBLEY
DONALD R. DIBLEY
BY
KOTTS & SHERIDAN
ATTORNEYS

United States Patent Office 2,913,293
Patented Nov. 17, 1959

2,913,293

FLUID SEALING DEVICE

Raymond A. Dibley and Donald R. Dibley,
Detroit, Mich.

Application January 4, 1957, Serial No. 632,612

5 Claims. (Cl. 309—23)

This invention relates generally to improvements in a plunger type valve and in particular to an improved piston and valve assembly suitable for use in checks in any fluid system.

In reciprocal fluid pumps the action of the piston on a delivery stroke must produce a seal between the piston or piston element and the wall. During this action, any valves in the piston or piston elements must be closed. On the return stroke the valves in the piston must be open to allow fluid to gather in the delivery chamber, and to prevent the pump from producing a partial vacuum below the piston on the return stroke, thus using considerable power in moving the piston. Many types of pistons and valve assemblies are used to accomplish the above outlined functions of the piston in the fluid pump. Some assemblies have metal to metal contact between the cylinder walls and the piston, and this produces wear. Other assemblies use pistons with a flexible non-metallic feather edge which operates against the cylinder walls. These latter assemblies require a positive stop below the feather edges to prevent damage to the feather edges during bottoming. Consequently, this type of assembly suffers from reduced delivery capacity because the piston is prevented from completely sweeping the enclosed volume by the bottoming stop.

An object of the present invention is to provide an improved valve construction whereby an O-ring type seal is attached to a piston assembly by means of a perforated flexible diaphragm, resulting in a more efficient valve.

It is another object of the present invention to provide a fluid sealing element which obtains the highly desirable results of an O-ring type seal while eliminating the disadvantages of the same.

It is the further object of the present invention to provide a fluid seal having limited area contact with the side walls (reducing power consumption) and yet obtaining the efficient strong seal of an O-ring.

Other objects are to provide a fluid seal which is simple in construction and positive and efficient in function, while being less expensive to manufacture than present seals.

Fig. 1 is a cross-section of the improved piston and valve assembly with an O-ring type seal in a cylinder. The parts are shown in the position they occupy during the upward or return stroke.

Fig. 2 is a bottom view of the device shown in Fig. 1.

Fig. 3 is a view similar to Fig. 1 showing the parts in position during a downward or pump stroke.

Fig. 4 is a cross-section of the improved piston and valve assembly with a modified O-ring type seal.

It is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

In Fig. 1, 1 represents the cylinder wall of any pump, and 2 is a piston rod fastened to main piston body 3. In one form, the main piston body 3 is made of a hard rubber or plastic material and does not contact the cylinder wall 1. The lower portion 4 of the piston body is formed of a circular thin flexible rubber or plastic, perforated intermittently as shown at 7, and forming an O-ring at its circumference 5. This is accomplished by injecting two different types of material into the mold. A single flexible type material might also be used, the thickness of the body 3 and the lower portion 4 rendering the lower portion 4 quite flexible and the body 3 quite rigid. The position of the O-ring 5 during the pump or pressure stroke is shown in Fig. 3, and its position during the return or withdrawal stroke is shown in Fig. 1.

During the pressure stroke, the O-ring 5 is seated in the groove 6 provided in the main body 3. Thus, on a pressure stroke O-ring 5 forms an efficient seal by seating itself in groove 6 and maintaining perfect contact with cylinder walls 1. On the return stroke, the flexible diaphragm 4 is brought down by the frictional drag of the O-ring 5 on the cylinder walls. This unseats the O-ring 5 from the groove 6 and allows the fluid to escape from the above piston around the main body 3 and through the perforations 7 in the flexible diaphragm 4.

In Fig. 4, the operation of the piston and modified O-ring is identical with that of Fig. 1 except that an additional lip-type seal 8 is added onto the O-ring 5. This seal 8 replaces the normal rounded edge of the O-ring and bears against the cylinder wall.

Having described our invention, we claim:

1. In a piston and seal assembly for the end of a reciprocal piston, the piston and seal assembly comprising, a rigid body portion; a thin perforated diaphragm extending therefrom; an annular O-ring of compressible material being adapted for contact with a pump cylinder and connected to said rigid body portion by said diaphragm; said rigid body portion being spaced from the cylinder wall and grooved on the lower edge of the circumference to limit movement of said annular O-ring, said O-ring sealing the space between said rigid body portion and said cylinder wall during the working downstroke; and a piston rod connected to said rigid body portion in the pump cylinder.

2. In a piston and seal assembly for the end of a reciprocal piston, the piston and seal assembly comprising, an annular rigid valve body element having a thickened hub; said hub having an axially opening blind socket on the top surface thereof to receive the end of a piston rod; said piston rod to control the relative movement of a reciprocal piston; said rigid valve body member being adapted for spaced relationship to a pump cylinder; a flexible perforated valve element spaced below said rigid body; said rigid body having an undercut intermediate said rigid body and said flexible perforated valve element; said flexible perforated valve element adapted for engagement with the pump cylinder permitting fluid passage through said perforations on the up stroke, sealing said perforated valve from fluid passage when the periphery of said flexible perforated valve element is in contact with the lower edge of said annular rigid valve body element on the down stroke.

3. In a piston seal assembly, an annular piston; said annular piston element circumferentially grooved so as to divide the piston into two sections; an upper rigid section and a lower flexible section, said upper rigid section being adapted for spaced relationship to a pump cylinder, at its circumference, said lower flexible section having a circumferential feather edge for contact with the pump cylinder; said lower flexible section having a plurality of spaced holes therein; a piston rod; and means for mounting said piston seal assembly to said piston rod.

4. In a valve construction for blocking fluid in a cylinder, the combination of an annular rigid disc having a central top opening blind socket portion located thereon; a groove in the lower circumferential edge of said rigid disc; a thin perforated diaphragm spaced beneath said rigid disc; said thin perforated diaphragm of larger diameter than said annular rigid disc and shaped at its periphery to fit the groove in the lower edge of said annular rigid disc; and a piston rod for actuating said valve.

5. In a valve construction for blocking fluid in a cylinder, the combination of an annular rigid disc having a central top opening blind socket portion therein; said annular rigid disc being spaced laterally from said cylinder wall and having a groove on its lower edge around the circumference; a thin perforated diaphragm spaced below said rigid disc portion; an O-ring on the periphery of said thin perforated diaphragm of larger diameter than said annular rigid disc; and said O-ring being shaped to engage the groove in the lower edge of said annular disc when the piston assembly is moved downward.

References Cited in the file of this patent
UNITED STATES PATENTS

| | | |
|---|---|---|
| 1,347,082 | Davis | July 20, 1920 |
| 1,362,838 | Brandt | Dec. 21, 1920 |
| 2,709,118 | Martin | May 24, 1955 |
| 2,727,471 | Martin | Dec. 20, 1955 |

FOREIGN PATENTS

| | | |
|---|---|---|
| 906,408 | Germany | Jan. 28, 1954 |